M. GREENWOOD.
SPRING BED.
APPLICATION FILED FEB. 12, 1921.
1,387,388.
Patented Aug. 9, 1921.
3 SHEETS—SHEET 1.
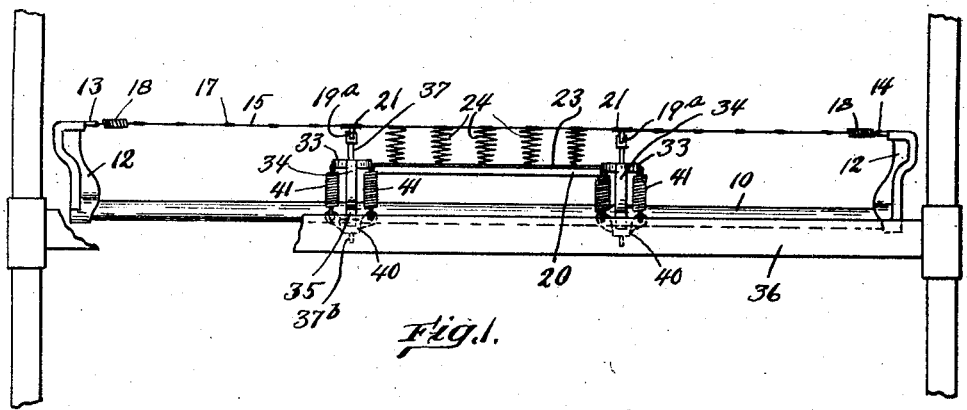
Fig. 1.
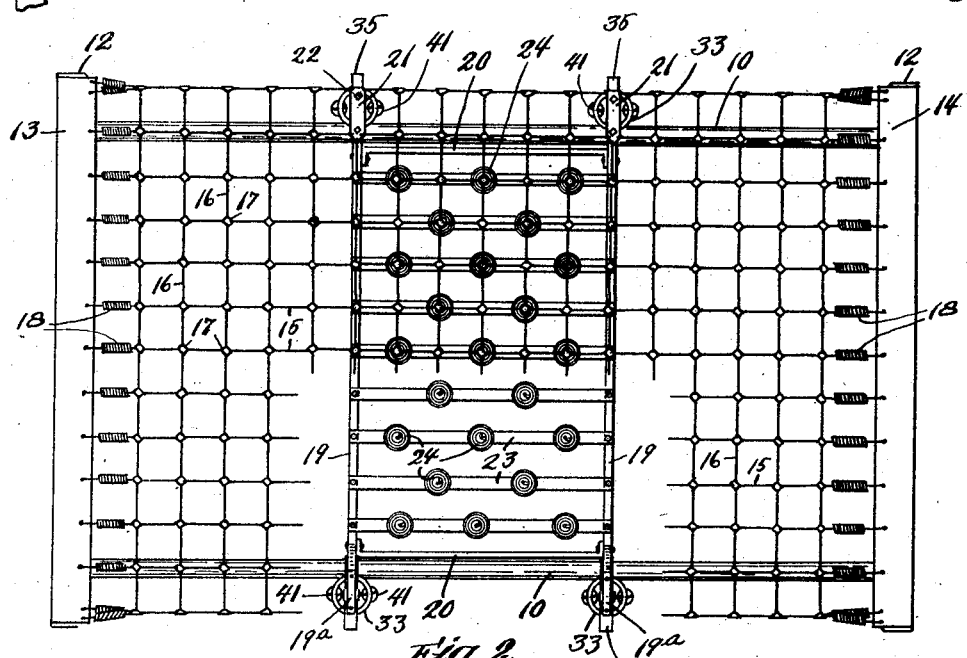
Fig. 2.
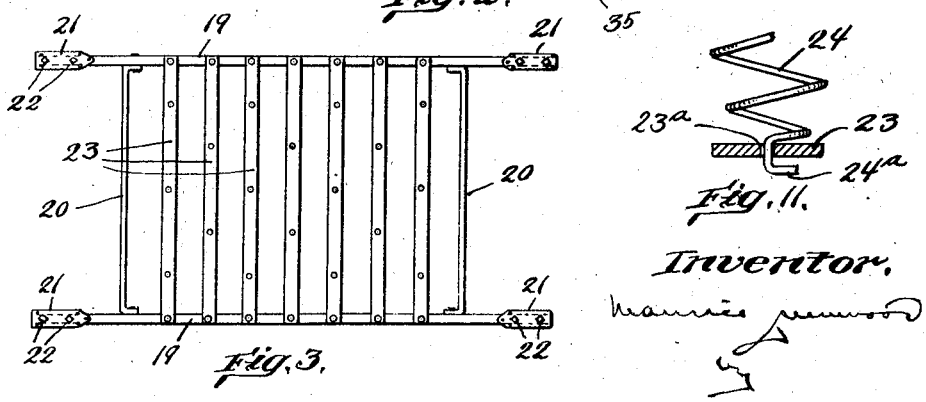
Fig. 3.
Fig. 11.
Inventor,
Maurice Greenwood
by
[signature] atty

M. GREENWOOD.
SPRING BED.
APPLICATION FILED FEB. 12, 1921.

1,387,388.

Patented Aug. 9, 1921.
3 SHEETS—SHEET 2.

Inventor.

M. GREENWOOD.
SPRING BED.
APPLICATION FILED FEB. 12, 1921.
1,387,388.
Patented Aug. 9, 1921.
3 SHEETS—SHEET 3.
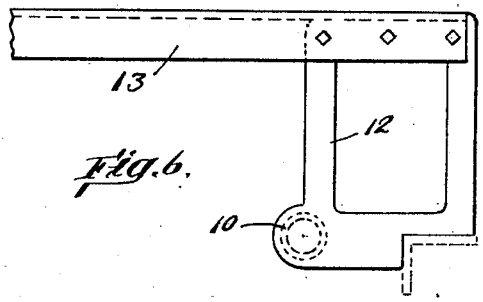
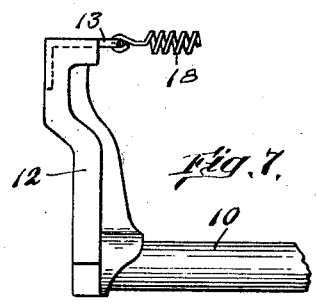
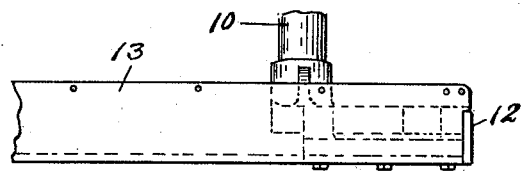
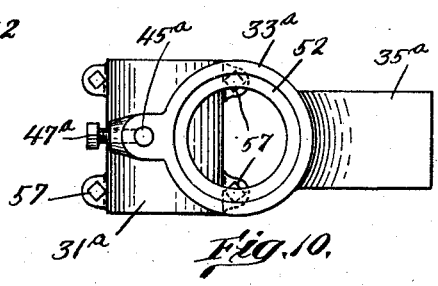
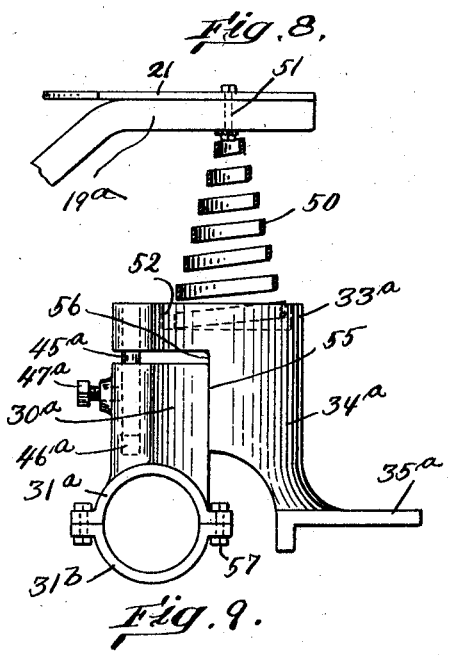
Inventor,

UNITED STATES PATENT OFFICE.

MAURICE GREENWOOD, OF REVERE, MASSACHUSETTS.

SPRING-BED.

1,387,388.　　　　Specification of Letters Patent.　　Patented Aug. 9, 1921.

Application filed February 12, 1921. Serial No. 444,523.

*To all whom it may concern:*

Be it known that I, MAURICE GREENWOOD, a citizen of the United States, residing at Revere, in the county of Suffolk and State of Massachusetts, have invented an Improvement in Spring-Beds, of which the following is a specification.

This invention relates to bed springs and has for its object to provide a spring having auxiliary resilient supporting means adapted locally to increase the resistance of the spring to deflection preferably at those points adapted to receive the greatest weight.

The invention is especially adapted for bed springs of the "National" type although not limited to the National spring.

Briefly the invention comprises an auxiliary spring structure adapted to extend transversely of the bed spring and be supported by the spring, or, it may be, by the bed, and having a plurality of spring elements adapted to be positioned under and support the mattress-supporting links or "fabric" of the bed spring yieldingly against downward displacement.

A further object is to provide an auxiliary spring-supporting structure as an attachment to existing bed springs.

A yet further object is generally to improve the construction of bed springs.

Figure 1 is a side elevation of a bed spring of the National type embodying my invention.

Fig. 2 is plan view of the spring of Fig. 1 with some of the links removed to illustrate more clearly the construction of the auxiliary spring-supporting structure.

Fig. 3 is a plan view of the auxiliary supporting frame.

Fig. 6 is a side detail of a modified form of supporting bracket for the National spring.

Figs. 7 and 8 are side and top details respectively of the structure illustrated in Fig. 6.

Fig. 9 is a side elevation in detail of a modified form of adjustable supporting bracket for the auxiliary frame structure.

Fig. 10 is a plan view of the bracket of Fig. 9.

Fig. 11 is a detail of a modified arrangement of means for securing the auxiliary springs to the supporting frame.

Figure 4:
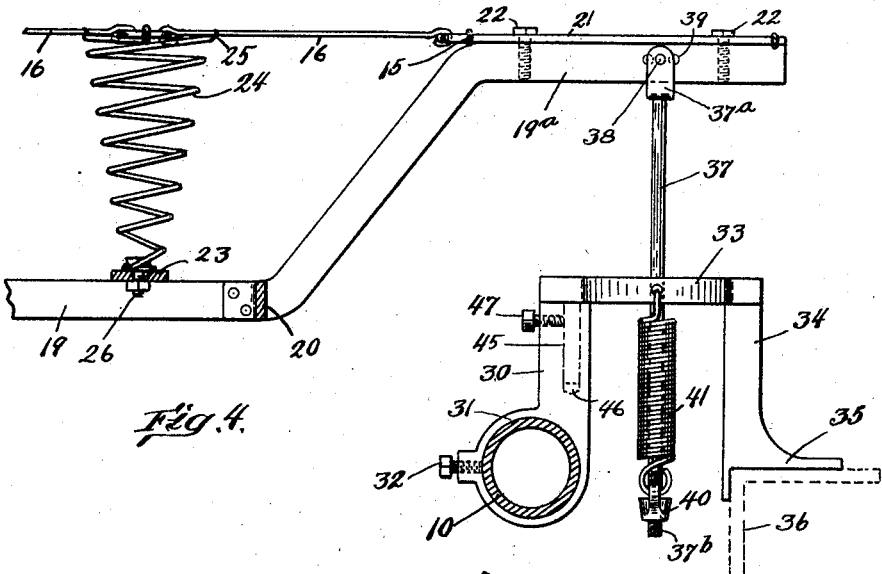
Fig. 4 is a side view in detail of one method of supporting the auxiliary supporting frame yieldingly from the side rails of the bed spring and also from the bed rails.

My invention is here shown applied to the National spring although it is not necessarily limited in its use to that type of spring.

The National spring here shown has the two tubular side members 10 on the ends of which are fixed the brackets 12 to which in turn are secured the head and foot spring-supporting members, usually L-shaped, 13 and 14, which in addition to serving as attaching means for the spring elements rigidly unite said side-members. The "fabric" of the spring, comprising the longitudinally arranged rows of links 15 and transversely arranged rows of links 16 connected through the connecting plates 17, is supported between said head and foot members by the coil springs 18 removably attached to said longitudinally arranged rows of links 15.

The auxiliary spring structure embodying my invention is adapted to be positioned under the middle of the spring, although obviously it may be placed at any other position thereunder, and supported by said spring and also resiliently supported by the side-members 10 of the spring and preferably also by the side rails of the bed.

Said auxiliary spring structure includes the frame composed of the transverse side bars 19 preferably spaced apart a distance corresponding to the distance between several transverse links 16 and the longitudinally arranged end-connecting and separating bars 20. Said frame is adapted to support a plurality of springs which in turn are adapted to engage and yieldingly support the fabric of the spring. Said frame is removably attached to the spring fabric and for this purpose the ends of said transverse members 19 are reflexed upwardly and then outwardly to provide elevated end attaching portions 19ª and a depressed body portion on which the auxiliary supporting springs are carried. As a convenient means for securing said frame to the spring fabric two of the transverse links 16 are removed between the two outermost longitudinal lines of links at each side of the spring fabric and the flat links or plates 21 are substituted.

The end-portions 19ª of said frame are secured removably to the under side of said plates by the bolts 22.

A plurality of auxiliary spring-supporting bars 23 are extended between and secured to said members 19 and the spacing of said bars is such that they lie preferably directly below the longitudinal rows of links 15 of the spring fabric and, preferably under all of the rows in the middle portion of the fabric.

The auxiliary springs 24 are preferably conical in shape and may be made of flat or round spring stock of suitable dimensions. Preferably, also, said springs are carried in an inverted position in the supporting frame so that the bases of the springs engage and support the links 15 and 16 at said plates 17 connecting said longitudinal links 15 and transverse links 16 and the apices of the springs engage and are secured to said bars 23. Said springs may be secured to the fabric of the bed spring by any suitable means as by the wire loops 25, Fig. 5, encircling the top convolutions of the springs and the links 15 and 16, or otherwise. The apices of the springs may be secured to said bars 23 by forming the lowermost convolutions of the springs as circular loops and passing the bolts 26 therethrough and also through bolt-openings in said bars. The springs may also be secured to said bars as illustrated in Fig. 11 wherein the end 24ª of the spring is inserted through an aperture 23ª of said bar 23 and reflexed over said bar.

Preferably said members 19 and 20 of the frame structure are relatively rigid and said bars 23 are somewhat flexible so that additional yielding of the spring fabric, over that provided by said auxiliary springs 24 alone, may be obtained. Preferably I support said springs on said bars 23 only although, obviously, I may support additional springs, not shown, by said members 19 and 20 if it should be found desirable to do so.

While, obviously, as many auxiliary springs may be used as are found to be necessary, I prefer to stagger said springs so that while the first bar 23 in from a side of the spring may support three auxiliary springs 24 which may support alternate transverse lines of links, the adjacent bar may support but two springs which may support the transverse lines of links skipped by the springs of said first bar; and so on.

In addition to supporting the auxiliary spring structure by the spring fabric, I provide means whereby it, and consequently the spring fabric, is supported yieldingly from the side members 10 of the spring and arranged for a certain extent of lateral movement while so yieldingly supported. Said means may include a bracket disposed under each end 19ª of the frame structure and engaging the side member 10, and preferably also the side rails of the bed; and resilient means yieldingly supporting said ends 19ª of the frame structure from said brackets.

Figure 5:
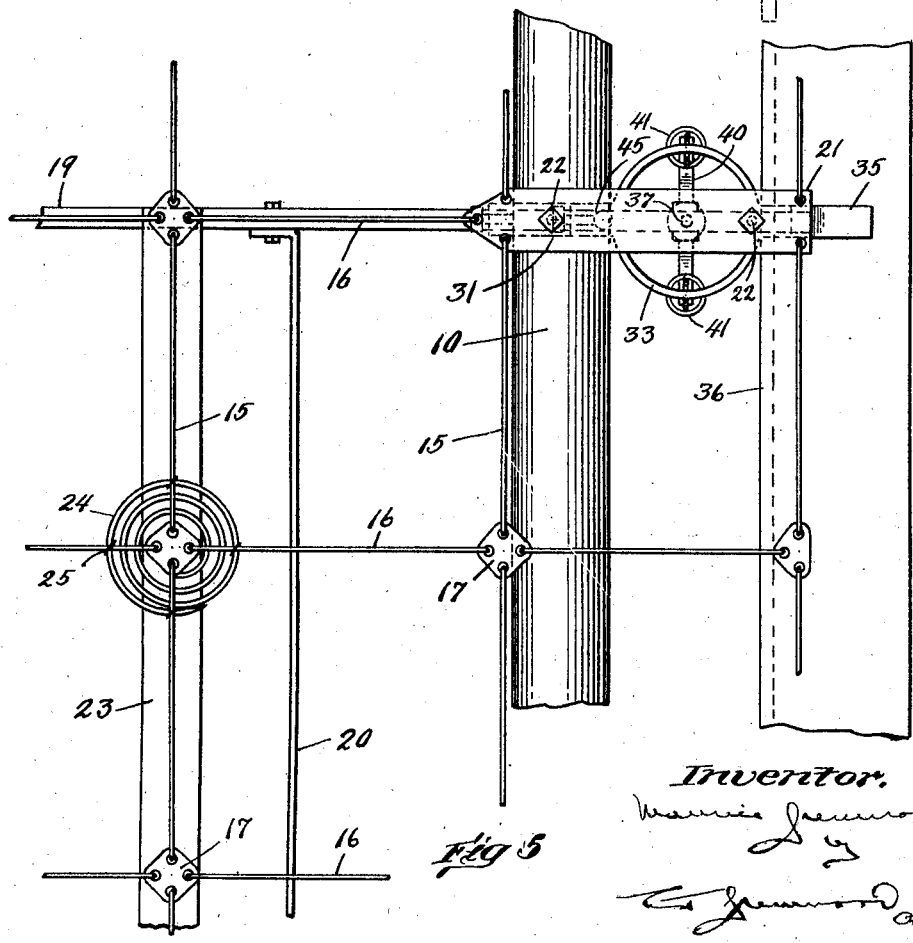
Fig. 5 is a plan detail of the structure of Fig. 4.

As shown in Figs. 4 and 5 each bracket includes the leg 30 having the lower apertured portion 31 through which the side member 10 of the spring is received and secured by the screw 32. Said leg depends from one side of a ring-member 33 from the other side of which depends a second leg 34 integral with said ring member 33; and said leg 34 terminates in a foot 35 which is adapted to rest upon the side rail 36 of the bed.

A rod 37 is extended through said ring member 33 and is provided with an upper forked end 37ª between which an end portion 19ª of one of said members 19 of the frame is received; and said rod is pivotally connected to said member by the pin 38 passed through the forked end of said rod and one of the apertures 39 in said end-portion 19ª. A plurality of said apertures 39 are provided to permit said rod initially to be adjusted in a substantially vertical position. The lower end of said rod extends below said ring-members 33 and between the side-member 10 and side rail 36 of the bed and is screw-threaded as at 37ᵇ. A wing nut 40 is threaded on said rod and two side springs 41 are connected with diametrically opposite sides of the wall of said ring-members and removably connected to the wings of said wing nut. By this arrangement said springs 41 serve to support said auxiliary-spring supporting frame and also the spring fabric from the side members 40 and also from the bed rails and permit, by reason of the clearance between the rods 37 and the walls of the ring members 33, a certain amount of bodily movement or displacement of the spring fabric in the plane of the fabric.

The tension of said springs 41 may be adjusted by detaching them from said wing nuts 40 and turning said nuts on said rods 37 in one or the other direction and then reconnecting the springs with said nuts.

It frequently happens that the side-members 10 of different springs will occupy different positions with respect to the side rails 36 of the bed; that is, some may be higher and others may be lower than the position illustrated in Fig. 4. To provide for such differences said leg 30 is adjustably connected to said ring-member 33; and for this purpose said ring-member has the depending pin 45 which is adjustably received in a recess 46 of said leg 30 and said leg 30 has a set screw 47 by which said leg and pin may be clamped in adjusted position. For a position of the side-members 10 relative to the side-rails 36 of the bed lower than the position illustrated in Fig. 4 said leg 30 and ring-member 33 will be separated, as illustrated in the modification shown in Fig. 9 hereinafter to be described, and clamped in adjusted position.

With the arrangement illustrated in Fig. 4 it will be found desirable to modify somewhat the disposition of the side rails 10 from their usual position, and specifically, to move said side rails inwardly toward each other to permit said springs 41 and rods 37 to be arranged as shown; and this is accomplished by forming the brackets 12, Fig. 6, of increased transverse length.

Figs. 9 and 10 illustrate a modified form of resilient supporting means for the auxiliary-spring frame wherein it is not necessary to alter the construction of the spring. In Figs. 9 and 10 the frame is resiliently supported at its four corners by conical springs 50 formed preferably of flat spring stock, as shown; and which admit of the lateral movement of the spring fabric. The apex of each spring may be secured to an end-portion 19$^a$ of the frame by suitable means, as by the bolt 51 passed through the top convolution of the spring and an aperture in said end-portion. The base of the spring is received in a recess 52 in the ring members 33$^a$ of the supporting bracket and may be secured removably therein by any suitable means. The supporting bracket includes the depending leg 34$^a$ and the foot 35$^a$ which rests upon the side rail 36 of the bed. A pin 45$^a$ is carried by and depends from said ring-member 33$^a$ and fits within the recess 46$^a$ of the other leg 30$^a$ of the bracket and may be secured in adjusted position therein by the set screw 47$^a$. Said leg 30$^a$ is formed with an inner face 55 which engages a corresponding face 56 of said leg 34$^a$ to assist said pin 45$^a$ to preserve alinement of said legs in adjusted positions thereof; and Fig. 9 illustrates one of such adjusted positions.

Whereas in Fig. 4 the side member receiving portion 31 of said leg is solid and the side-member 10 must be inserted therein, in Fig. 9 the corresponding portion 31$^a$ is made in two portions and can be applied to the side-member 10 by removing the cap 31$^b$; and said leg may thereafter be clamped in position by replacing the cap 31$^b$ and tightening the bolts 57.

While I have herein shown certain preferred embodiments of the invention, it is obvious that the structure may be variously modified without departing from the spirit of the invention.

I claim:

1. A spring bed comprising a frame including a pair of rigid side-members, a fabric, a plurality of tensile springs connecting the head and foot edges of said fabric whereby to support said fabric resiliently under tension, and means to support said fabric locally comprising an auxiliary frame disposed beneath and carried by said fabric and having its opposite sides secured rigidly to the opposite side edges of said fabric, and springs carried by said auxiliary frame extended upwardly and in engagement with said fabric to support it, and springs carried by said rigid side-members in engagement with said auxiliary frame whereby additionally to support it.

2. A spring bed comprising a fabric, resilient supporting means for said fabric including a pair of rigid side-members, auxiliary means to support the fabric locally comprising auxiliary springs disposed beneath and engageable with a portion of the fabric, a supporting frame bearing said auxiliary springs secured rigidly to opposite side-portions of said fabric and supported thereby, and additional means arranged to support said frame yieldingly from said rigid side-members.

3. A spring bed comprising a fabric, resilient supporting means for it, and auxiliary means carried by said fabric for supporting said fabric locally comprising a supporting frame disposed beneath the fabric having its ends secured to said fabric and a plurality of springs carried by said frame yieldingly engaging and supporting said fabric.

4. A spring bed comprising a fabric, resilient supporting means for it, and auxiliary means carried by said fabric for supporting said fabric locally comprising a supporting frame disposed beneath the fabric having its end portions secured removably to said fabric, and a plurality of compression springs carried by said frame extended upwardly to engage and yieldingly support said fabric.

5. A spring bed comprising a fabric, resilient supporting means for it including a pair of side-members, auxiliary supporting means for supporting said fabric locally comprising a supporting frame disposed beneath and rigidly secured to and carried by the fabric and springs carried by said frame engaging and yieldingly supporting the fabric, and additional means arranged to support said frame yieldingly from said side-members, comprising brackets carried by said members and resilient means extended between said brackets and frame, and means to adjust the tension of said resilient means.

6. A spring bed comprising a fabric, resilient supporting means for it including a pair of side-members, an auxiliary-spring supporting frame disposed beneath said fabric and means to support it comprising brackets having legs attached to said side-members and other legs adapted to rest upon the rails of the bed, and means to adjust the height of said legs relative to each other, and springs connecting said frame with said brackets.

7. An auxiliary spring structure for a spring bed having a spring-supported fabric and side-members, said auxiliary spring structure comprising a frame adapted to be disposed beneath the fabric of the spring-bed, fabric supporting springs carried by said frame, means to attach said frame to the fabric, and means to support said frame yieldingly from the side-members of the spring bed comprising brackets adapted to be secured to the side-members, rods extended downward from said frame and tensile springs connecting said brackets and rods.

8. An auxiliary spring structure for a spring bed having a spring-supported fabric and side-members, said auxiliary spring structure comprising a frame adapted to be disposed beneath the fabric of the spring bed, fabric supporting springs carried by said frame, means to attach said frame to the fabric, and means to support said frame yieldingly from the side-members of the spring bed, comprising brackets adapted to be secured removably to the side-members, rods extended downward from said frame, tensile springs connecting said brackets and rods, and means to adjust the tension of said springs.

9. An auxiliary spring structure for a spring bed having a spring-supported fabric and side-members, said auxiliary spring structure comprising a frame adapted to be disposed beneath the fabric of the spring bed, fabric supporting springs carried by said frame, means to attach said frame to the fabric, and means to support said frame yieldingly from the side-members of the spring bed, comprising brackets having legs adapted to be secured to the side members and other legs adapted to rest upon the side rails of the bed, means to vary the height of the legs of the brackets, and frame-supporting springs connecting said frame and said brackets.

In testimony whereof, I have signed my name to this specification.

MAURICE GREENWOOD.